United States Patent [19]

Kitzmiller

[11] 4,346,695
[45] Aug. 31, 1982

[54] SOLAR HEAT EXCHANGER

[76] Inventor: George Kitzmiller, 721 E. 5 St., Miami, Fla. 33010

[21] Appl. No.: 121,521

[22] Filed: Feb. 14, 1980

[51] Int. Cl.³ .............................................. F24J 3/02
[52] U.S. Cl. .................................... 126/444; 126/448
[58] Field of Search ............................... 126/444, 448

[56] References Cited

U.S. PATENT DOCUMENTS

| | | | |
|---|---|---|---|
| 3,215,134 | 11/1965 | Thomason | 126/444 |
| 3,995,615 | 12/1976 | Hojnowski | 126/444 |
| 4,038,967 | 8/1977 | Stout et al. | 126/444 |
| 4,141,341 | 2/1979 | Eby | 126/444 |
| 4,243,020 | 1/1981 | Mier | 126/444 |
| 4,249,519 | 2/1981 | Martinez | 126/450 |

*Primary Examiner*—Carroll B. Dority, Jr.
*Attorney, Agent, or Firm*—John Cyril Malloy

[57] ABSTRACT

A solar heat exchanger comprising a frame having an inner surface area defined by upstanding walls, ends and bottom wherein an insulation layer of relatively uniform thickness is spread throughout the inner surface. A plurality of channels are spaced throughout the frame. The channels may be arranged in a serpentine or manifold design and may comprise an outer curved wall and an inner curved wall wherein water flows through the inner and outer curved wall and spaced between the inner and outer curved wall in a restricted manner. Additionally, the frame may include a top insulation layer comprising generally parallel panels spanning the frame and creating a greenhouse effect upon the channels. Inlet and outlet means are provided within the frame to allow cooler water to enter the exchanger and warmer water to exit.

10 Claims, 7 Drawing Figures

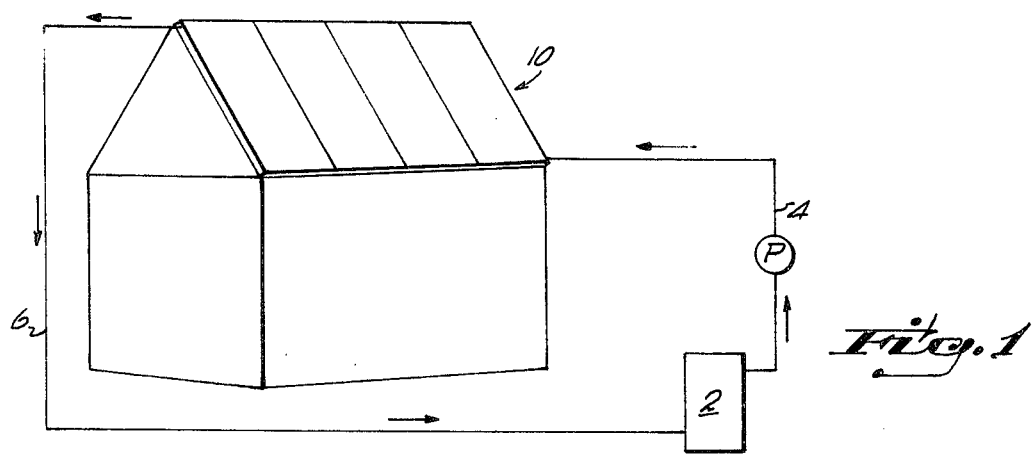
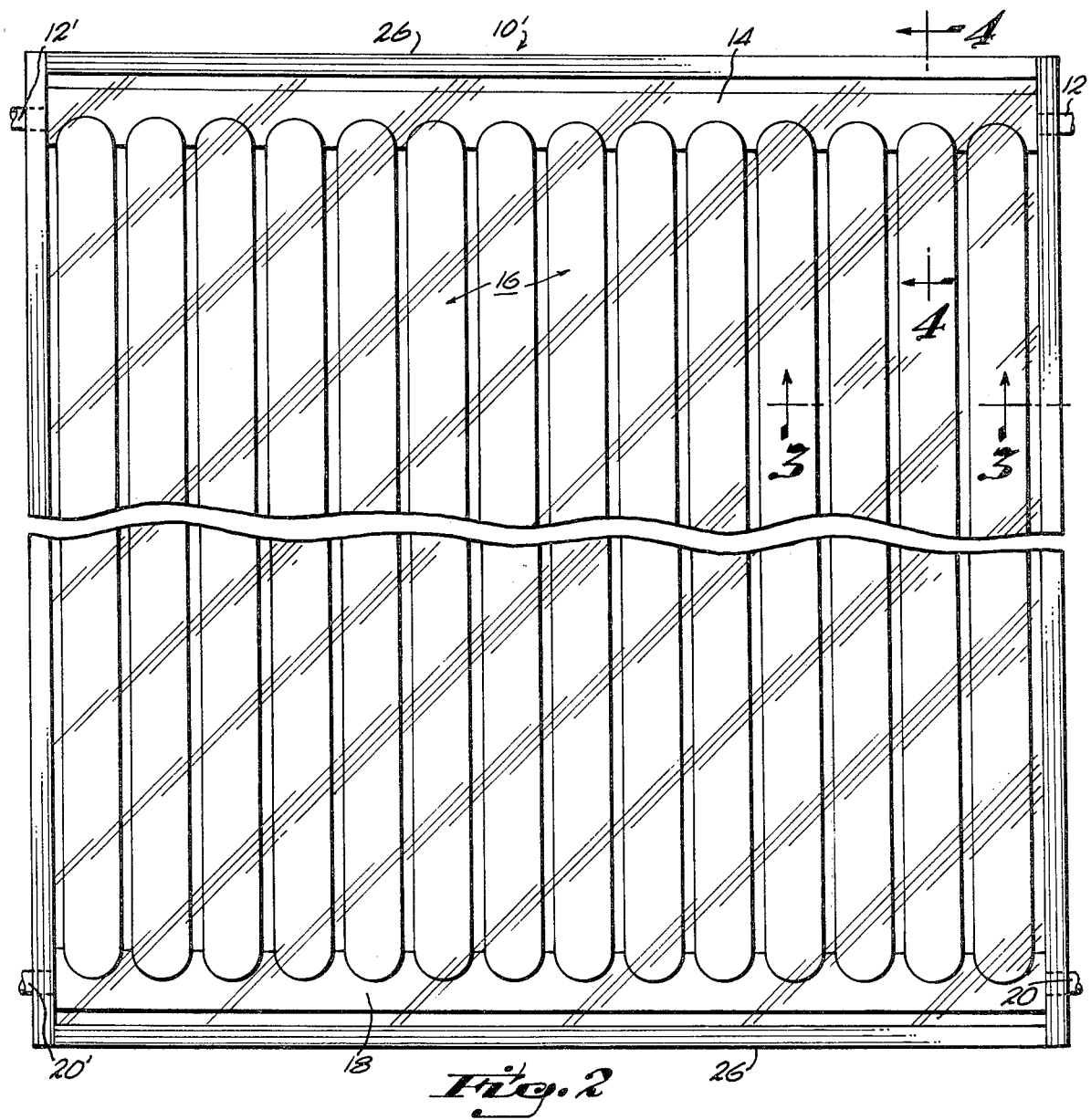

SOLAR HEAT EXCHANGER

FIELD OF THE INVENTION

This invention relates to solar heat exchangers and, more particularly, to solar heat exchangers having a double channel wherein the fluid flows in a restricted manner between the channels said insulation means are provided both at the top and the bottom of the exchanger.

BACKGROUND OF THE INVENTION

In the past there have been many forms of solar heat exchangers. There have been serpentine and manifold heat exchangers as is illustrated by U.S. Pat. Nos. 4,059,095 and 4,120,286 respectively. There have been solar heat exchangers which attempted insulation at the top of the structure by means of an insulation layer such as those represented by Stout, U.S. Pat. No. 3,918,430 wherein solar energy was trapped by the panels located at the top of the structure. There have even been attempts at insulation at the bottom such as the Stout structure. These structures have been found lacking in that the structures fail to raise the fluid temperatures to a high enough level which would be more desirable by a user.

Applicant has provided a structure wherein there is a frame having an inner surface within the frame having insulation material uniformly spread throughout it, the channels are provided throughout the inner surface resting upon and surrounded by the insulation, the channels comprise an outer and an inner wall restricting the flow of fluid through the channels to a thin film which may be heated to a temperature higher than would ordinarily be possible with the structures described above.

Applicant has invented a structure wherein the sun's solar energy is transformed into a heating source which may be used, for example, in pools, bathing water and in general as a convenient, economical heat source as well as industrial use.

BRIEF DESCRIPTION OF THE INVENTION

A solar heat panel comprising a a heat exchanger including a frame having first and second ends and side walls, the combination defining an inner surface. The inner surface layered with an insulation material of relatively uniform thickness throughout the inner surface area. The exchanger including channels spaced throughout the frame resting upon the insulation layer and the channels comprising an outer wall having a curvature and an inner wall spaced a predetermined distance from the outer wall and a predetermined distance from the inner layer having a curvature similar to the outer wall curvature; and panels spaced across the frames and spanning the ends and side walls defining a solar heat trapping means.

The frame includes inlet means allowing fluid to enter the channels wherein the fluid is restricted in flow throughout the channels and an outlet means allowing the heated fluid to return to the point where desired.

It will be appreciated that the device as will be explained more fully hereinafter can be used to heat swimming pools and the like. Additionally, as a result of the highly efficient heat exchanger structure a device may be used for industrial purposes, for example, the heating of chemicals, or highly corrosive liquids, e.g. acids, which will not burn or destroy the conduits or other exchange structure of the heat exchanger as will be explained more fully hereinafter.

DESCRIPTION OF THE DRAWINGS

FIG. 1 is a perspective view of the invention shown in use;

FIG. 2 is a top plan partially sectional view of one embodiment of the invention;

DETAILED DESCRIPTION OF THE PREFERRED EMBODIMENT

Figure 3:
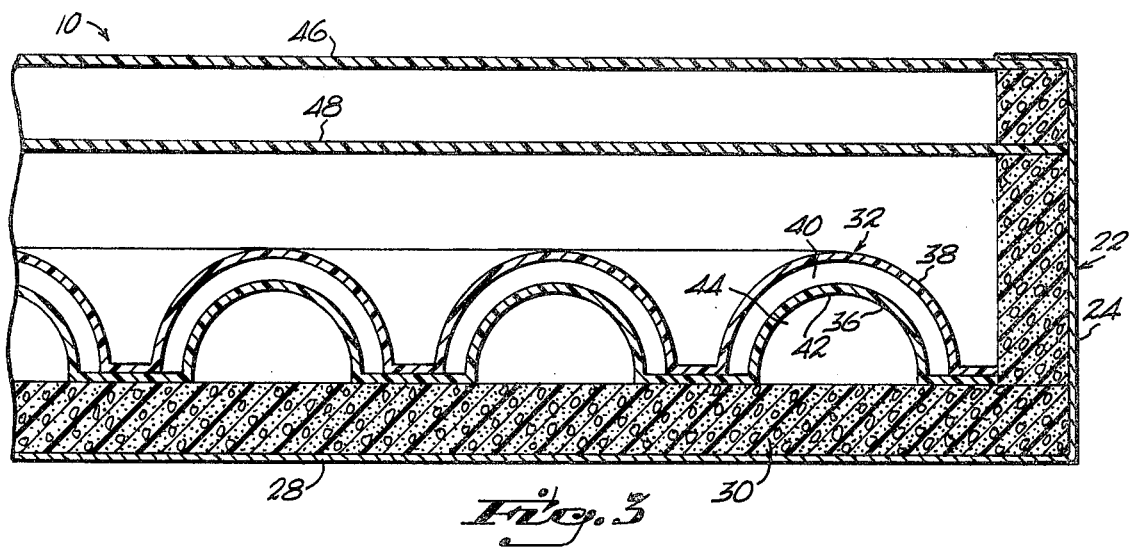
FIG. 3 is a cross sectional view of either the embodiment shown in FIG. 2 or FIG. 6.

Referring to the drawings wherein like reference characters designate like or corresponding parts throughout the several views and referring particularly to FIG. 1, there is shown a plurality of heat exchangers generally designated by the numeral 10 of the type which will be described more fully hereinafter positioned on a roof for maximum solar exposure. The solar panels are connected to the system shown in FIG. 1 which includes a storage tank 2 containing a fluid which is pumped by pump P through conduit means 4 to the solar panels 10 for heating and the heated fluid is returned to the storage tank 2 through conduit means 6.

Referring to FIG. 2 there is shown a particular embodiment of the invention generally designated by the numeral 10', a manifold-type solar heat exchanger according to the design which will be described more fully hereinafter. As can be seen, the manifold-type solar heat exchanger includes an inlet means 12 which is in open communication with the conduit 4 from which it receives fluid to be heated. The inlet means in a manifold solar heat exchanger according the precepts of this invention includes inlet means 12 connected to a cylinder-like tube 14 which is in open communication with channels generally designed as 16. The water to be heated flows through the inlet means to the cylinder-like tube through the channels where it is heated and out the channels to the cylinder-like outlet 18 to an outlet means 20 where the heated fluid is returned to the storage tank 2 through conduit means 6.

It will be noted that alternate inlet and outlet means 12' and 20' respectively could be used in place of inlet and outlet means 12 and 20 respectively. In the event that such alternate means are not used, they are capped with a plug [not shown]. Additionally, a user may use 12 or 12' as the outlet means where 20 or 20' are being used as the inlet means.

Figure 6:
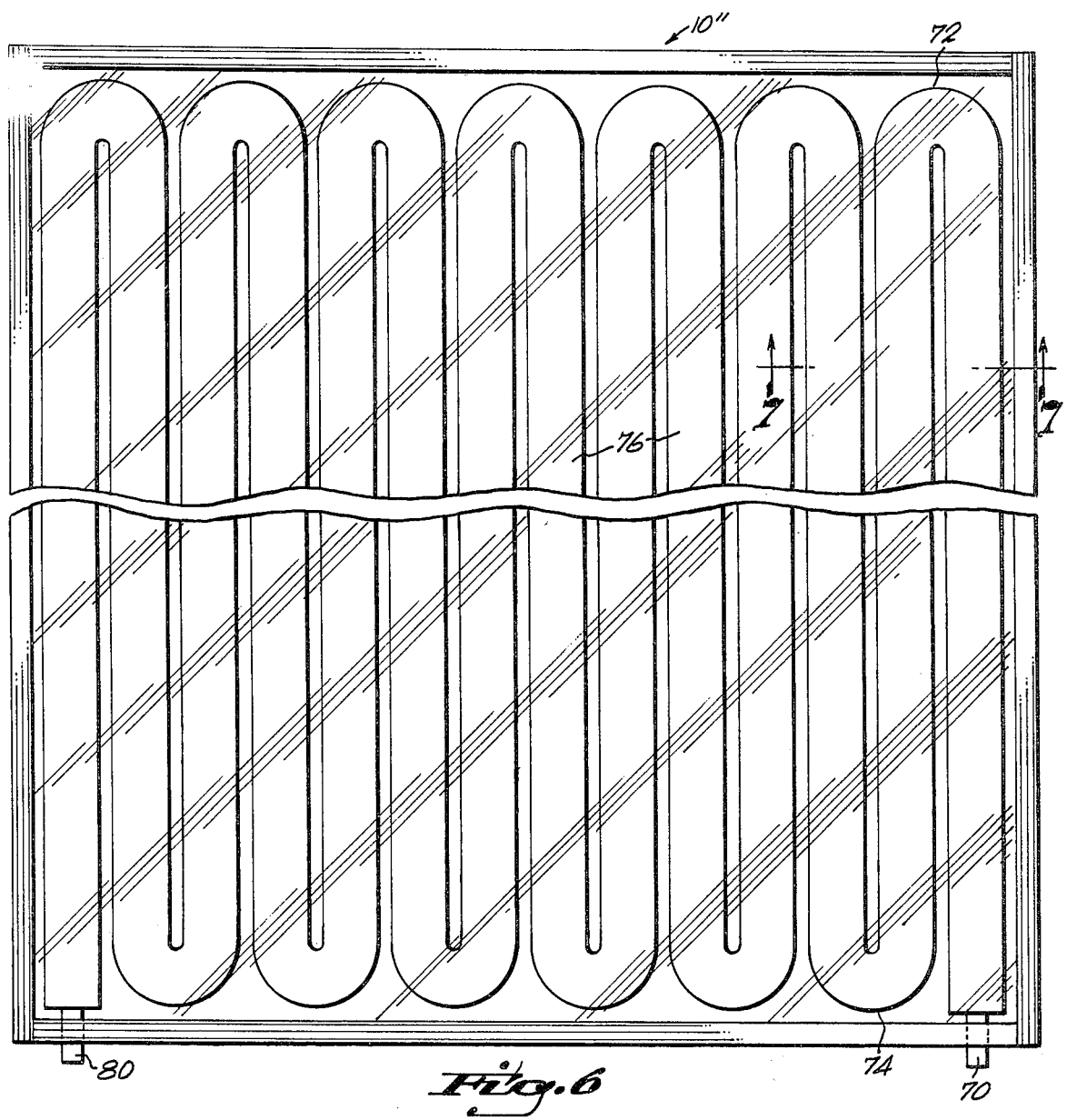
FIG. 6 is a top plan view of an alternative embodiment of the invention showing a serpentine heat exchanger.

Referring particularly to FIG. 3 there is shown a cross section of either FIG. 6 or FIG. 2, an embodiment of the invention comprising a heat exchanger 10 including a frame 22 having upstanding side walls 24, end walls 26 (See FIG. 2) and a bottom 28. The above elements taken together comprise an inner surface which is covered with a layer of insulation material of uniform thickness generally denoted by the numeral 30. The insulation material may include any suitable insulation material. It has been found that polyurethane is especially adaptable for this use.

Figure 5:
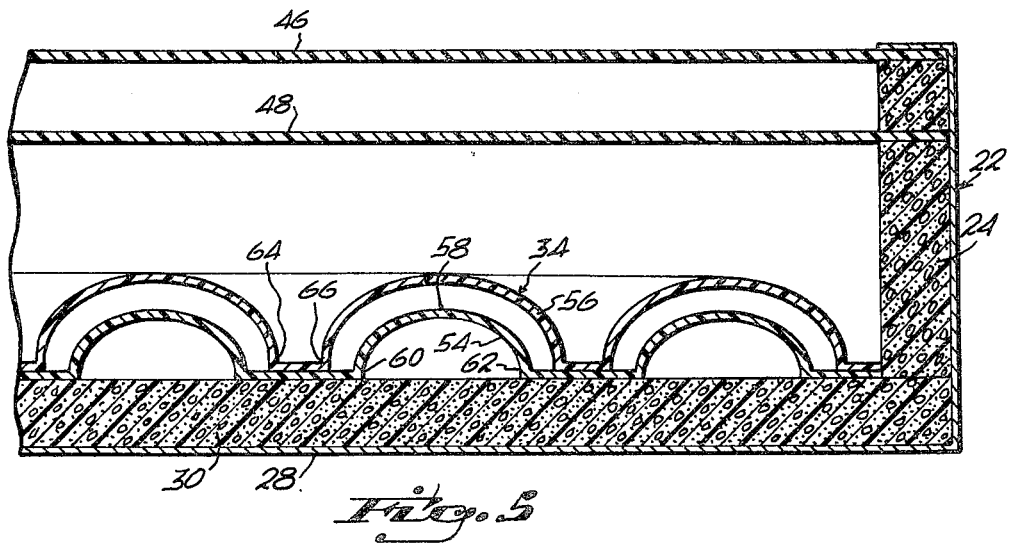
FIG. 5 is a cross sectional view of another embodiment of the channels of either the embodiment shown in FIG. 2 or FIG. 6.

The solar heat exchanger includes channels generally denoted 32 which can be of various shapes as is illustrated by numeral 34 of FIG. 5. The channels rest within the interior of the frame and upon the insulation material of the bottom of the frame 28. The channels comprise an inner wall 36 and an outer wall 38. Fluid flows through the space between the two walls designated generally by the numeral 40. In this manner the flow through the walls is relatively restricted which causes a thinner layer of fluid to be heated. The thin layer allows the fluid to be heated to a higher temperature than a larger layer. In addition, the restricted flow creates a frictional force as fluid moves through the channels causing an increased heating effect. In this manner, applicant achieves a greater temperature of the heated fluid as it passes through the channels than would otherwise be possible. Additionally, the channels include a middle portion 42 which is spaced apart from the frame insulation layer 30 and more particularly from the bottom frame 28.

An insulation space is formed between the inner wall and the insulation layer generally denoted 44. In this way the heated fluid does not lose the high temperature accomplished by the restricted flow.

Additionally, the embodiment illustrated in FIG. 3 of applicant's invention contains an additional insulation layer which comprises a plurality of parallel panels spanning the end and side walls designated 46 and 48. The panels are spaced apart a predetermined distance and creating a "greenhouse effect" upon the solar heat exchanger, as the panels retain some of the heat which is reflected or lost through solar heating.

Figure 4:
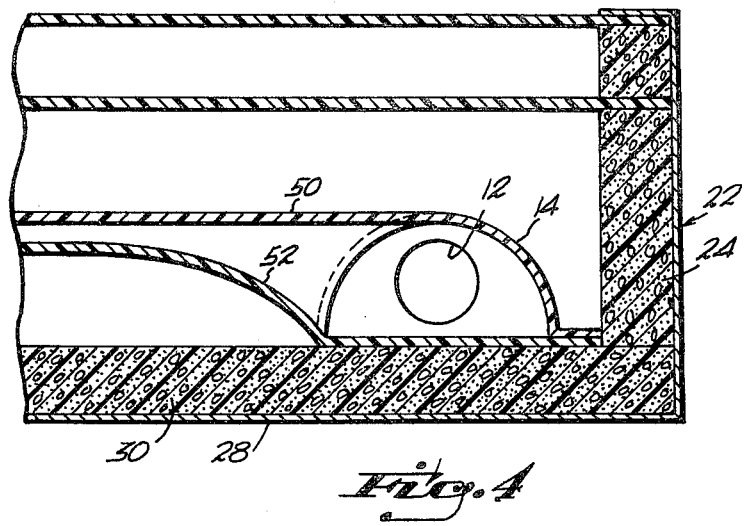
FIG. 4 is an enlarged cross sectional view of the inlet means taken along line 4—4 of FIG. 2 and alternatively is a cross sectional view of the inlet means of the embodiment shown in FIG. 6.

Referring particularly to FIG. 4, there is shown the inlet means 12 in an enlarged cross section connected to the cylinder-like tube 14. Fluid flows through the inlet means 12 to the cylinder-like member 14 which converges along the two wall portions 50 and 52 which also serve as a restriction means upon the flow of water again causing heat and allowing a thin film of fluid to be heated in the channels.

Referring particularly to FIG. 5, there is shown an alternative embodiment of the applicant's invention having semi-elliptical channel members. It will be noticed that the embodiment illustrated in FIG. 5 is a cross section of either FIG. 2 or FIG. 6. The ellipsodial channels comprise and inner wall 54 and an outer wall 56 each having an ellipsodial curvature. Fluid flows between the walls in a restricted manner as stated above. In the ellipsodial chanel form, the invention is believed to accumulate more heat than the uniform curvature embodiment since the curvature of the outer wall permits a more constant heating and less loss due to reflection.

Again, an insulation space is formed between the inner wall and the frame insulation layer as basically set forth above. Similarly, the alternative embodiment is provided with panels 46 and 48 which serve to produce a greenhouse effect upon the overall system. In practice, it has been found that the height at the apex, generally denoted by the numeral 58, which is the maximum distance between the inner wall and the insulation layer should be between the range of 1 inch to $1\frac{1}{2}0$ inch. The width of the channel which comprises the distance between one end of the channel 60 and another end of the channel 62 should be between 3 and 5 inches. Further, the space between the channels which may be defined as the space between 64 and 66 should be between $\frac{1}{8}$ and $\frac{3}{8}$ of an inch.

In the uniform radius embodiment, it has been found that the radius of curvature of the walls should be between $1\frac{1}{2}$ inches and $2\frac{1}{2}$ inches and the height should be approximately $1\frac{1}{2}$ inches. Further, the space between the channels is between $\frac{1}{8}$ and $\frac{3}{8}$ of an inch.

Figure 7:
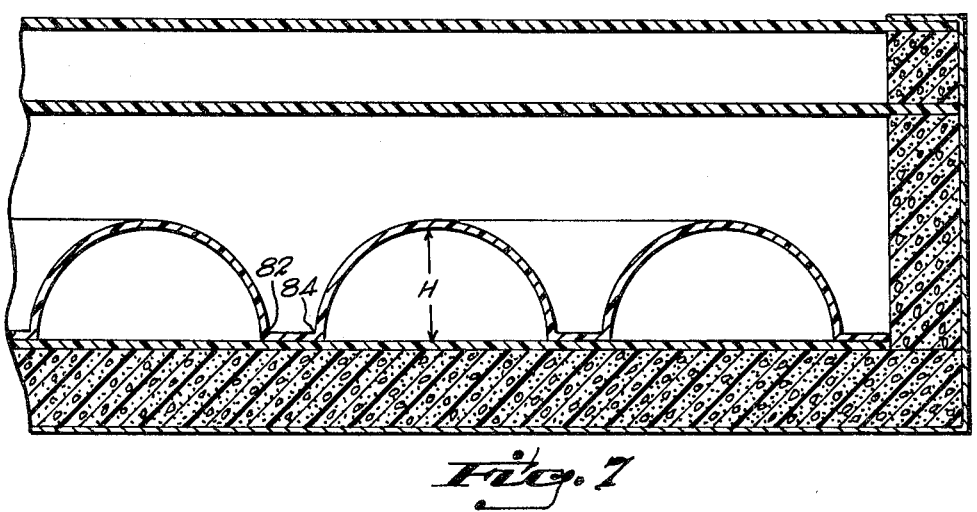
FIG. 7 is a cross sectional view of one embodiment of the serpentine heat exchanger taken along line 7—7 of FIG. 6.

With particular reference to FIG. 6, there is seen an alternative embodiment 10″ which comprises a serpentine heat exchanger having an inlet means 70 and an outlet means 80. The channel is of a single nature having multiple 180° bends such as is illustrated at 72 and 74. The channel members may be as shown in FIG. 7 or FIGS. 3 or 5. In this embodiment, the channels are in effect a single channel having the multiple 180° bends, however, the portions between the bends comprise channel segments, such as at 76. With respect to FIG. 7, there is shown the alternative embodiment not having the inner wall but having a height of H which is equal to $1\frac{1}{2}$ inches and a radius of curvature of between $1\frac{1}{2}$ to $2\frac{1}{2}$ inches and the space between the channels designated by 82 to 84 is between $\frac{1}{8}$ to $\frac{3}{8}$ of an inch.

In order to efficiently transfer the solar energy from the outer wall to the fluid within the channel, the outer wall may be impregnated with a heat conductive material such as graphite or aluminum powder. The resulting outer wall will have increased efficiency wherein solar energy will be readily and more efficiently transferred from the solar source to the fluid which flows in a restricted manner through the channels.

While water has been the normal fluid which would ordinarily be the source to carry and store the solar energy for heating purposes in such devices, it is known by applicant that other fluids including water having chlorine may be used in swimming pools and the like. In these mixtures and compositions which have yet to be determined, the material may indeed result in an optimum solution which is highly corrosive. Therefore, applicant makes his channel member walls of a material which is highly resistive to such potentially corrosive heating fluids. Applicant uses either CPVC or fiberglass for these members.

Further, although it is well known in the art, applicant coats his outer surface of the outer wall with a black rough material for maximum solar absorption.

Additionally, the use of a water fluid or a water derivative fluid containing materials which have a solution having a greater ability to store, be heated to a higher temperature and therefore carry a fluid having a higher temperature to the object to be heated may be used and applicant specifically does not limit his fluid to water.

While the instant invention has been shown and described herein in what is conceived to be the most practical and preferred embodiment, it is recognized that departures may be made therefrom within the scope of the invention, which is therefore not to be limited to the details disclosed herein but is to be accorded the full scope of the claims so as to embrace any and all equivalent apparatus and articles.

What is claimed is:

1. A solar heat exchanger comprising:
   a frame including a bottom, first and second ends, and upstanding side walls defining an inner surface area, an insulation layer of approximately uniform thickness throughout the inner surface area, a plurality of channels arranged throughout the frame resting upon the insulation material, each channel having inner and outer walls wherein fluid flows in a restricted manner between the walls through the channel, the inner wall spaced a predetermined distance from the insulation layer defining an insulation space, solar heat trapping means comprising:

a plurality of parallel spaced apart relatively thin transparent panels spanning the side and end walls of the frame, for minimizing heat loss due to reflection and for creating a greenhouse effect increasing the amount of heating on the fluid flowing through the channels, and the frame including inlet means in open communication with at least one channel for allowing relatively cool fluid to enter the heat exchanger and outlet means in open communication with at least one channel for allowing heated fluid to exit the heat exchanger for use in heating;

said heat exchanger comprising a serpentine heat exchanger as follows:

the channels comprise one relatively long channel having multiple 180° bends defining approximately equal channel segments, the channel includes a first end defining an outlet means and a second end defining an outlet means;

each channel comprising an ellipsodial shape, the inner wall being of an ellipsodial curvature and the outer wall being of an ellipsodial curvature, the ellipsodial inner wall spaced a predetermined distance from the insulation layer defining an ellipsodial inner insulation space, the outer wall spaced a predetermined distance from the inner wall, the ellipsodial walls defining an ellipsodial channel, wherein a fluid may flow in a restricted manner between the inner and outer walls.

2. The device as set forth in claim 1 wherein the inner ellipsodial wall includes an apex, the predetermined distance between the apex and the frame insulation layer is between 1 inch and 1½ inch.

3. The device as set forth in claim 2 wherein the width of the channel is between 3 and 5 inches.

4. The device as set forth in claim 3 wherein the channels are spaced apart a predetermined distance from each other and that distance is between ⅛ inch to ⅜ inch.

5. The device as defined in claim 1 wherein the channels are spaced apart a predetermined distance and that predetermined distance is between ⅛ to ⅜ of an inch.

6. The device as set forth in claim 1 wherein the insulation layer comprises polyurethane.

7. The device as set forth in claim 1 wherein the channels comprise material resistive to highly corrosive fluid.

8. The device as set forth in claim 7 wherein the channels are made of C.P.V.C., a highly corrosive resistant material.

9. The device as set forth in claim 7 wherein the channel walls are made of fiberglass.

10. The device as set forth in claim 9 wherein the outer wall includes an outer surface which is black in color and rough in texture.

* * * * *